US007070532B2

(12) United States Patent
Stevenson et al.

(10) Patent No.: US 7,070,532 B2
(45) Date of Patent: Jul. 4, 2006

(54) PLANETARY TRANSMISSION HAVING A ROTATING-TYPE TORQUE-TRANSMITTING MECHANISM WITH A STATIONARY PISTON

(75) Inventors: Paul D. Stevenson, Ann Arbor, MI (US); Raymond J. Haka, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 66 days.

(21) Appl. No.: 10/785,509

(22) Filed: Feb. 24, 2004

(65) Prior Publication Data

US 2005/0049106 A1 Mar. 3, 2005

Related U.S. Application Data

(60) Provisional application No. 60/498,269, filed on Aug. 26, 2003.

(51) Int. Cl.
*F16H 31/00* (2006.01)
(52) U.S. Cl. ............... 475/116; 475/331; 192/87.15
(58) Field of Classification Search ............ 475/114, 475/116, 331; 192/87.11, 87.14, 87.15
See application file for complete search history.

(56) References Cited

U.S. PATENT DOCUMENTS

| 4,732,253 | A  | * | 3/1988  | Hiramatsu et al. | ....... 192/87.11 |
| 6,315,096 | B1 | * | 11/2001 | Dairokuno et al. | ........... 192/35 |
| 6,716,128 | B1 | * | 4/2004  | Kuramoto et al.  | .......... 475/207 |
| 6,827,664 | B1 | * | 12/2004 | Stevenson et al. | .......... 475/275 |
| 6,878,086 | B1 | * | 4/2005  | Sugiura et al.   | ............. 475/279 |

* cited by examiner

*Primary Examiner*—Tisha Lewis
(74) *Attorney, Agent, or Firm*—Christopher DeVries

(57) ABSTRACT

A planetary transmission has a plurality of rotating-type torque-transmitting mechanism that are operable to connect a rotating input mechanism with one or more planetary gear members. At least two of the rotating-type torque-transmitting mechanisms are radially stacked and axially aligned. At least one of the radially stacked rotating torque-transmitting mechanisms has an apply piston that is slidably mounted in a stationary transmission housing, an apply plate that is rotatable with a portion of the torque-transmitting mechanism, and a bearing disposed therebetween to accommodate relative rotation therebetween.

7 Claims, 6 Drawing Sheets

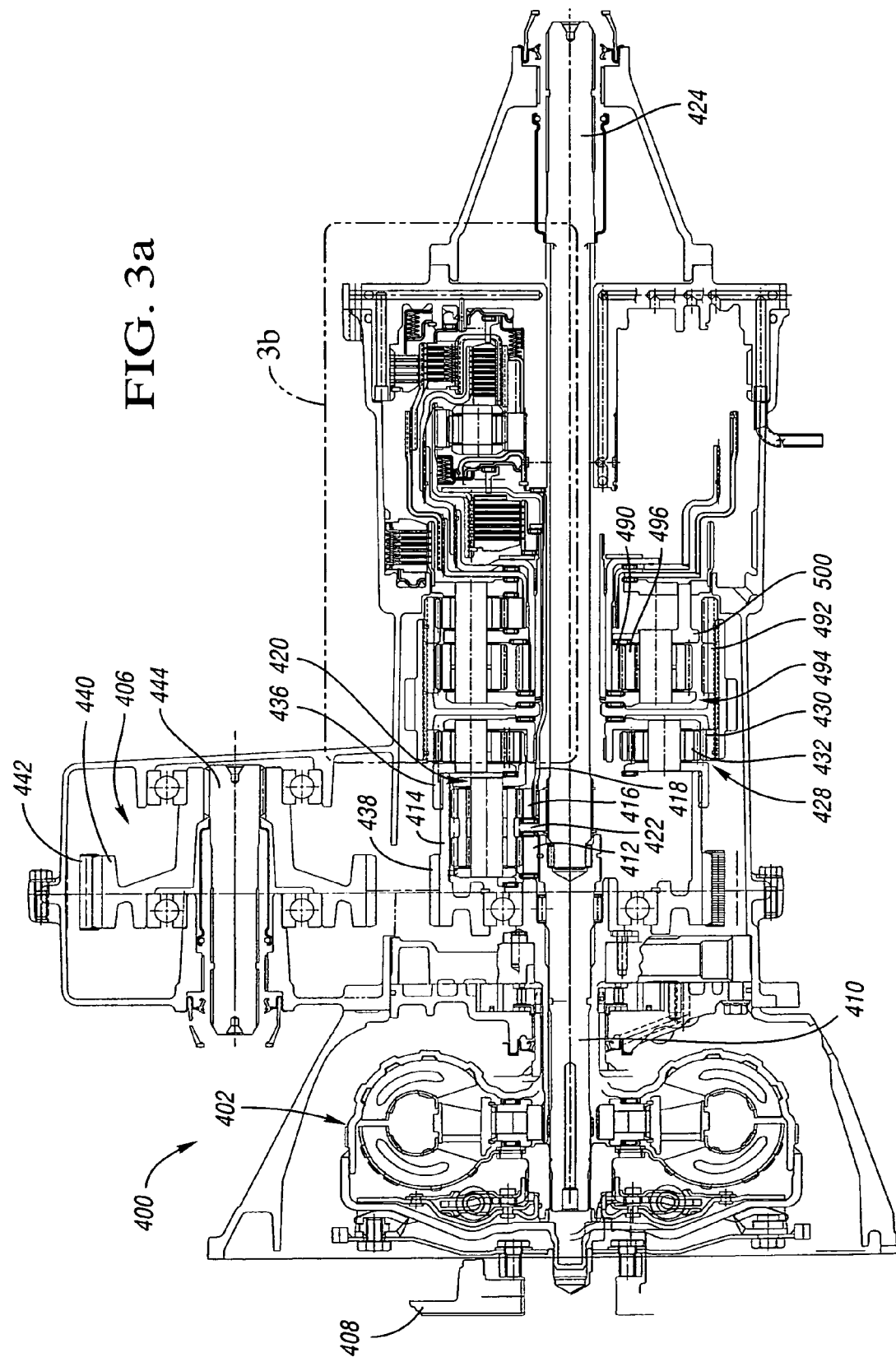

PLANETARY TRANSMISSION HAVING A ROTATING-TYPE TORQUE-TRANSMITTING MECHANISM WITH A STATIONARY PISTON

CROSS-REFERENCE TO RELATED APPLICATION

This application claims the benefit of U.S. Provisional Application 60/498,269, filed Aug. 26, 2003, which is hereby incorporated by reference in its entirety.

TECHNICAL FIELD

This invention relates to rotating-type torque-transmitting mechanisms in power transmissions, especially rotating-type torque-transmitting mechanisms having a stationary piston.

BACKGROUND OF THE INVENTION

Power transmissions generally utilize one or more rotating-type torque-transmitting mechanisms, commonly termed clutches. The clutch assembly generally includes a piston slidably disposed in a housing, a plurality of interdigitated friction discs, one splined with a housing and the other splined with a hub, and a backup plate splined to one of the members.

The piston is normally rotated with one of the housing members. A fluid pressure is applied between the housing and the piston into an apply chamber to cause the piston to engage with a pressure plate which abuts one of the friction plates. The friction plates are placed into frictional contact such that rotating power is transmitted between the two housing members or hub members of the clutch. The piston apply chamber is generally full of oil when the piston is not actuated and is subjected in many cases to centrifugal force which could cause the piston to apply, thereby partially engaging the clutch and inducing wear on the friction plates. To compensate for this centrifugal pressure, some clutches employ a ball dump valve placed within the piston or within the housing rotating with the piston. The ball dump valve is effective to open at a predetermined speed of the rotating speed of the piston or housing, thereby relieving the fluid within the apply chamber, provided the pressure within the apply chamber is at or below a predetermined value. The use of these ball dump valves is well known.

Other clutch assemblies use what is termed a centrifugal dam, which is a chamber on the side of the piston opposite the apply chamber. The centrifugal dam is permitted to fill with lubrication oil such that the centrifugal force within the centrifugal dam portion will counterbalance whatever centrifugal force is present within the apply chamber. Both of these systems are effective to prevent centrifugal apply of the piston.

Another element that is of interest in rotating-type torque-transmitting mechanisms is the shaft seal assembly, which is present between the rotating housing and a rotating shaft. At times during operation, these two members will be rotating at different speeds, thereby creating a frictional loss within the seal assembly, which is termed as a drive loss within the transmission.

SUMMARY OF THE INVENTION

It is an object of the present invention to provide an improved rotating-type torque-transmitting mechanism for use in a power transmission wherein the rotating-type torque-transmitting mechanism has a stationary (i.e., non-rotating) piston member.

In one aspect of the present invention, a power transmission includes two rotating-type torque-transmitting mechanisms that are radially aligned and at least partially axially overlapping and wherein one of the rotating-type torque-transmitting mechanisms has a stationary piston which is slidably disposed in a stationary housing.

In another aspect of the present invention, a power transmission includes three radially aligned rotating-type torque-transmitting mechanisms wherein each rotating-type torque-transmitting mechanism has a stationary piston slidably disposed in a stationary housing.

In yet another aspect of the present invention, a power transmission includes three torque-transmitting mechanisms that are radially aligned and wherein two of the torque-transmitting mechanisms are of the rotating-type, each having a stationary piston slidably disposed in a stationary housing.

In still yet another aspect of the present invention, a power transmission has three rotating-type torque-transmitting mechanisms that are selectively connectible with a planetary gear arrangement, and wherein two of the torque-transmitting mechanisms are disposed on one axial side of the planetary gear set, and the third is disposed on the opposite axial side of the planetary gear set, and further wherein each of the rotating-type torque-transmitting mechanisms includes a respective stationary piston that is slidably disposed in respective stationary housings.

In a further aspect of the present invention, each of the rotating-type torque-transmitting mechanisms having stationary pistons includes a rotary bearing disposed between the stationary piston and a rotating member of the torque-transmitting mechanism.

In a further aspect of the present invention, the transmission housing forms first, second and third stationary piston chambers which are positioned radially outward of each other, sequentially.

In a yet further aspect of the present invention, a power transmission includes a plurality of stationary pistons for rotating-type torque-transmitting mechanisms, wherein centrifugal forces are eliminated from the system during discontinuance of operation of the torque-transmitting mechanisms.

In yet still a further aspect of the present invention, a power transmission having a plurality of stationary piston-type rotating torque-transmitting mechanisms provides an improved packaging arrangement by reducing the axial space requirement for the torque-transmitting mechanisms.

The present invention provides rotating-type torque-transmitting mechanisms (clutches) each having a stationary piston. The stationary piston eliminates the need for rotating-type oil transfer structures and also the need for reducing or eliminating centrifugal forces that the oil might apply to the piston. The rotating-type torque-transmitting mechanisms with stationary pistons require less space and reduced mass, and they eliminate drag losses between the rotating shaft seals and the rotating housing. By reducing or eliminating the centrifugal effects, an improved controllability is permitted with the transmission system.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 1b is an enlarged cross-sectional view taken from area 1b of FIG. 1a.

FIG. 3a is a cross-sectional view of a power transmission incorporating a further embodiment of the present invention.

FIG. 3b is an enlarged cross-sectional view taken from area 3b of FIG. 3a.

DESCRIPTION OF THE PREFERRED EMBODIMENTS

Figure 1A:
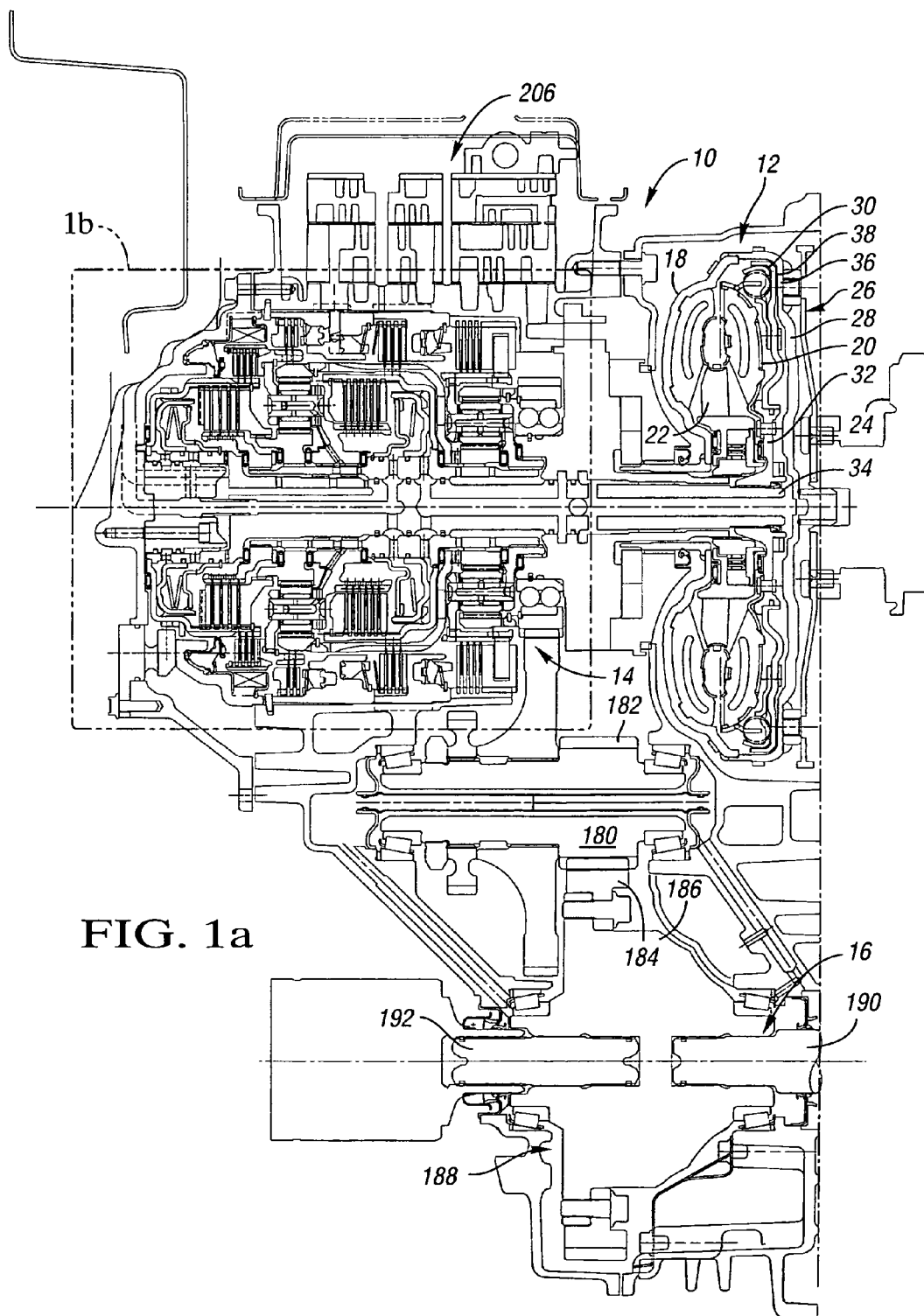
FIG. 1a is cross-sectional elevational view of a power transmission incorporating one embodiment of the present invention.
Figure 1B:
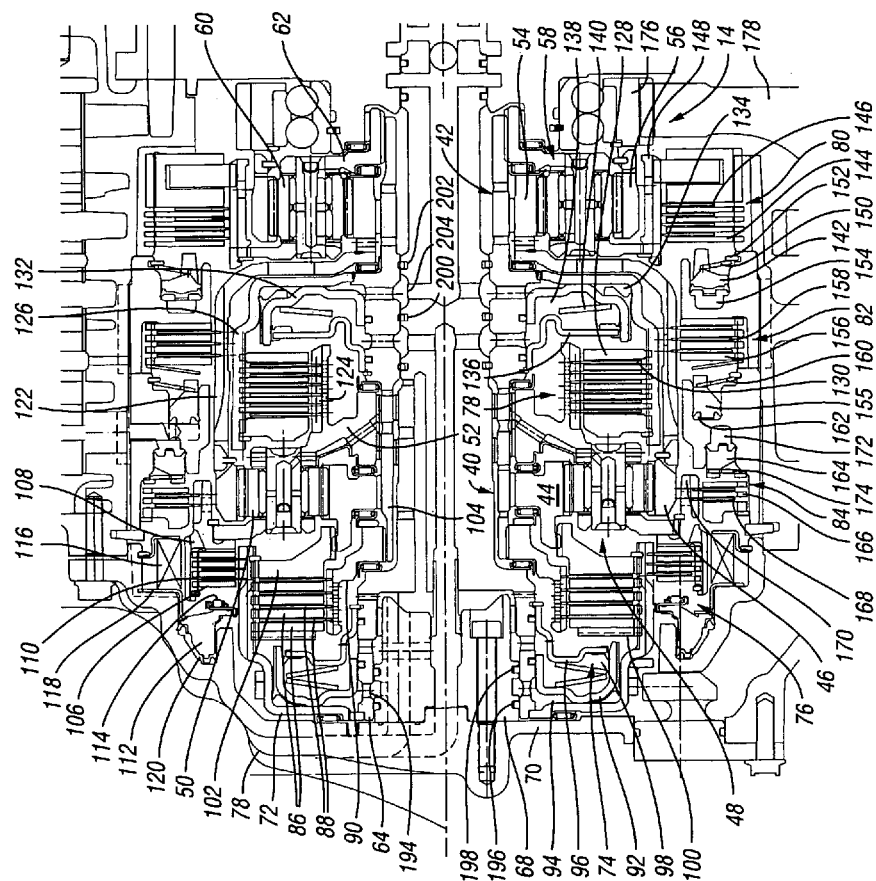

Referring to the drawings, there is shown in FIGS. 1a and 1b a planetary transmission 10, which includes a conventional torque converter 12, planetary gear arrangement 14, and a final drive mechanism 16. The torque converter 12 includes an impeller 18, a turbine 20, and a stator 22. The impeller 18 is connected with an engine crankshaft 24 through a flex plate 26 and an input shell 28. A conventional torque converter clutch 30 is disposed between the turbine 20 and the input shell 28. The torque converter clutch 30 has one portion secured to the turbine 20 and includes a hub 32, which is splined to a transmission input shaft 34. The torque converter clutch 30 has an apply plate 36, which includes a friction surface 38 that engages the inner surface of the input shell 28. When the torque converter clutch is applied, as is well known, a direct drive between the engine crankshaft 24 and the transmission input shaft 34 is provided. During torque converter operation, a hydrodynamic drive is present between the engine crankshaft 24 and the transmission input shaft 34. These hydrodynamic-type drives are well known in the art.

The planetary gear arrangement 14 includes two planetary gear sets 40 and 42. The planetary gear set 40 has a sun gear member 44, a ring gear member 46, and planet carrier assembly member 48. The planet carrier assembly member 48 includes a plurality of pinion gears 50 rotatably mounted on a planet carrier member 52. The planetary gear set 42 includes a sun gear member 54, a ring gear member 56, and a planet carrier assembly member 58. The planet carrier assembly member 58 includes a plurality of pinion gears 60 rotatably mounted on a planet carrier member 62.

The input shaft 34 has an end section 64 that is rotatably supported on a housing extension 68 that is secured to a transmission housing 70. The housing extension 68 is stationary as is the housing 70 relative to the rotation of the transmission input shaft 34. The end section 64 has drivingly connected therewith a clutch housing or hub 72.

The planetary gear arrangement 14 includes three rotating-type torque-transmitting mechanisms or clutches 74, 76, and 78, and three stationary-type torque-transmitting mechanisms or brakes 80, 82, and 84. The clutch 74 has a plurality of friction or clutch plates 86 that are splined to the hub or housing 70, and a plurality of friction plates 88 that are splined with a hub 90. The clutch 74 also includes an apply piston 92 that is slidably supported in the housing 70 and cooperates therewith to form an apply chamber 94. The clutch 74 also includes a wall member 96 that cooperates with the apply piston 92 to create a centrifugal dam cavity 98. The clutch 74 also has a pressure plate 100 and a backing plate 102 that are splined to the housing 74 for common rotation therewith. The hub 90 is splined or otherwise drivingly connected with a sleeve shaft 104 that is drivingly connected with the carrier member 62 of the planet carrier assembly member 58. Thus, when the apply chamber 94 is pressurized sufficiently, the clutch 74 will engage thereby connecting the input shaft 34 with the carrier 62 of the planet carrier assembly member 58. The backing plate 102 is splined or otherwise drivingly connected with the sun gear member 44, such that the sun gear member 44 rotates in unison with the input shaft 34.

The clutch 76 includes a plurality of clutch plates 106 that are splined with or otherwise drivingly connected to a hub 108. The clutch 76 also includes a plurality of friction plates 110 that are splined with or otherwise drivingly connected to the housing 70, which rotates in unison with the input shaft 34. Other components of the clutch 76 include a piston 112, a roller or thrust bearing assembly 114, and a plurality of return springs 116. The bearing 114 is disposed between the piston 112, which is slidably disposed in the transmission housing 70, and the leftmost of the clutch plates 106. The piston 112 has an extension 118 that abuts the return springs 116 to urge the piston 112 into the housing 70 whenever an apply chamber 120 formed between the piston 112 and the housing 70 is not pressurized. When the chamber 120 is pressurized, the piston 112 will engage the clutch 76 such that a drive connection is established between the input shaft 34 and the hub 108. The hub 108 is splined to or otherwise drivingly connected with the planet carrier 52 of the planet carrier assembly member 48. Thus, whenever the clutch 76 is applied, the planet carrier assembly member 52 and the sun gear member 44 are interconnected for common rotation with the input shaft 34. When the clutch 76 is engaged, the planetary gear set 40 will rotate in unison, that is, as a single unit.

The ring gear member 46 of the planetary gear set 40 is drivingly connected with a hub or shell 122 which is, in turn, drivingly connected with or otherwise secured to the sun gear member 54. Therefore, the ring gear member 46 and the sun gear member 54 will operate as a single unit. Thus, when one of these members rotates, the other member rotates, and when one of these members is held stationary, the other member is held stationary.

The clutch 78 has an inner hub portion 124 integral with the planet carrier 52, an outer hub portion 126 drivingly connected with the sleeve shaft 104, a plurality of clutch plates 128 splined to the hub 126, a plurality of friction plates 130 splined to the hub 124, and an apply piston 132. The apply piston 132 is slidably supported in the hub 126 and cooperates therewith to form an apply chamber or cavity 134.

A wall or dam member 136 is supported on the sleeve shaft 104 and slidably disposed within the piston 132. The dam wall 136 and piston 132 cooperate to form a centrifugal dam cavity 138. A return spring 140, in the form of a Belleville-type spring, is disposed between the dam wall 136 and the piston 132 to encourage disengagement of the piston when the cavity 134 is not pressurized. The dam cavity 138 is available to be filled with lubrication fluid to counterbalance any centrifugal fluid pressure that is generated within the cavity 134. When the cavity 134 is pressurized, the planet carrier assembly member 48 and the planet carrier assembly member 58 will rotate in unison.

The brake 80 includes an apply piston 142 slidably disposed in the transmission housing 70, a plurality of brake plates 144 splined to the transmission housing 70, and a plurality of friction plates 146 splined to a hub 148 that is drivingly connected with the carrier 62 of the planet carrier assembly member 58. A Belleville-type return spring 150 is disposed between a retaining ring 152 secured in the housing 70 and the piston 142 to urge disengagement of the piston whenever an apply chamber 154, formed between the piston 142 and the housing 70, is not pressurized. When the apply chamber 154 is pressurized, the brake 80 will be applied to retard rotation of the planet carrier 62.

The brake 82 includes an apply piston 155 that is slidably disposed in the transmission housing 70, a plurality of friction plates 156 splined to the housing 70, a plurality of friction plates 158 splined to the hub 122, a return spring 160 disposed between the housing 70 and the piston 154. The piston 154 cooperates with the housing 70 to form an apply chamber 162 which when pressurized will cause engagement of the brake 82. When the brake 82 is pressurized, the hub 122 will be held stationary, thereby retarding rotation of both the ring gear member 46 and the sun gear member 54.

The brake 84 includes an apply piston 164 that is slidably disposed in the housing 70, a plurality of brake plates 166 splined to the housing 70, and a plurality of friction plates 168 splined to a hub 170 that is drivingly connected with the planet carrier 52 of the planet carrier assembly member 48. The piston 164 cooperates with the housing 70 to create an apply chamber 172. A return spring 174 is disposed between the housing 70 and the piston 164 to urge the piston 164 into the chamber 172 and out of engagement with the brake plates 166. When the piston 164 is energized with pressure in the chamber 172, the brake 84 is effective to retard rotation of the carrier 52 of planet carrier assembly member 48.

The ring gear member 56 is drivingly connected with a transfer gear 176, which meshes with another transfer gear 178. The transfer gear 178 is splined with or otherwise drivingly connected to a shaft 180 on which is formed a final drive gear 182. The final drive gear 182 meshes with a final drive gear 184 that is drivingly connected with a housing 186 of a conventional final drive differential 188. The differential 188 includes two output shafts 190 and 192, which are operatively connected in a well-known manner to drive the wheels of a vehicle, not shown.

As can be seen in FIGS. 1a and 1b and understood from the foregoing description, the clutch 76 is disposed radially outboard of the clutch 74. The clutch 76 includes the stationary piston 112 which has the apply chamber 120 supplied with fluid through passages, not shown, formed in the housing 70. Thus, the piston 112 does not require any rotating-type seals. The clutch 74 is supported on the end section 64, which is rotatably supported on the housing extension 68. The apply chamber 94 of the clutch 74 is supplied with fluid through radial passages 194 that are formed in the end section 64. In order to eliminate leakage from the passages 194, a pair of seals 196 and 198 are supplied which effectively prevent leakage of fluid between the end section 64 and the housing extension 68.

The rotating torque-transmitting mechanism or clutch 78 also has rotating-type seal structures 199 and 201 which seal on opposite sides of a feed passage 203 that supplies pressurized fluid to the chamber 134 when it is desired to engage the clutch 78. The three rotating-type torque-transmitting mechanisms or clutches 74, 76, and 78 reduce the overall axial space requirement by radially stacking the clutches 74 and 76 and by placing the clutch 78 on the opposite side of the planetary gear set 40. It should also be apparent to those skilled in the art that the drag losses in the transmission are reduced due to the fact that the piston 112 is not a rotating structure, and therefore does not require the rotating-type seal assemblies. The thrust bearing 114 does provide some increased drag; however, it is greatly reduced from the constant drag that is present when rotating-type seals must be provided.

The use of the stationary piston 112 also simplifies the oil routing from the control system represented at 205. This control system is an electro-hydraulic control system, which is generally controlled by an electronic control unit, which might include a programmable digital computer. This controller 205, as is well known, supplies hydraulic fluid to control the engagement of the various clutches and brakes within the transmission. The fluid must be routed from the control 205 to the various friction devices that are to be controlled. By providing the clutch 76 with a stationary piston, the routing passages can be formed within the stationary transmission housing 70, which greatly simplifies the routing of oil and the reduction of the need for rotating-type seals.

The planetary transmission 10 provides five forward speeds and one reverse speed between the input shaft 34 and the transfer gear 176. The reverse speed ratio is provided with the engagement of the torque-transmitting mechanism 76 and the torque-transmitting mechanism 80. The first and lowest forward speed ratio is established with the engagement of the torque-transmitting mechanism 78 and the torque-transmitting mechanism 80. The second forward speed ratio is established with the engagement of the torque-transmitting mechanism 78 and the torque-transmitting mechanism 82. The third forward speed ratio is established with the engagement of the torque-transmitting mechanism 78 and the torque-transmitting mechanism 74. The fourth forward speed ratio is established with the engagement of the torque-transmitting mechanism 74 and the torque-transmitting mechanism 82. The fifth forward speed ratio is established with the engagement of the torque-transmitting mechanism 74 and the torque-transmitting mechanism 84.

Figure 2:
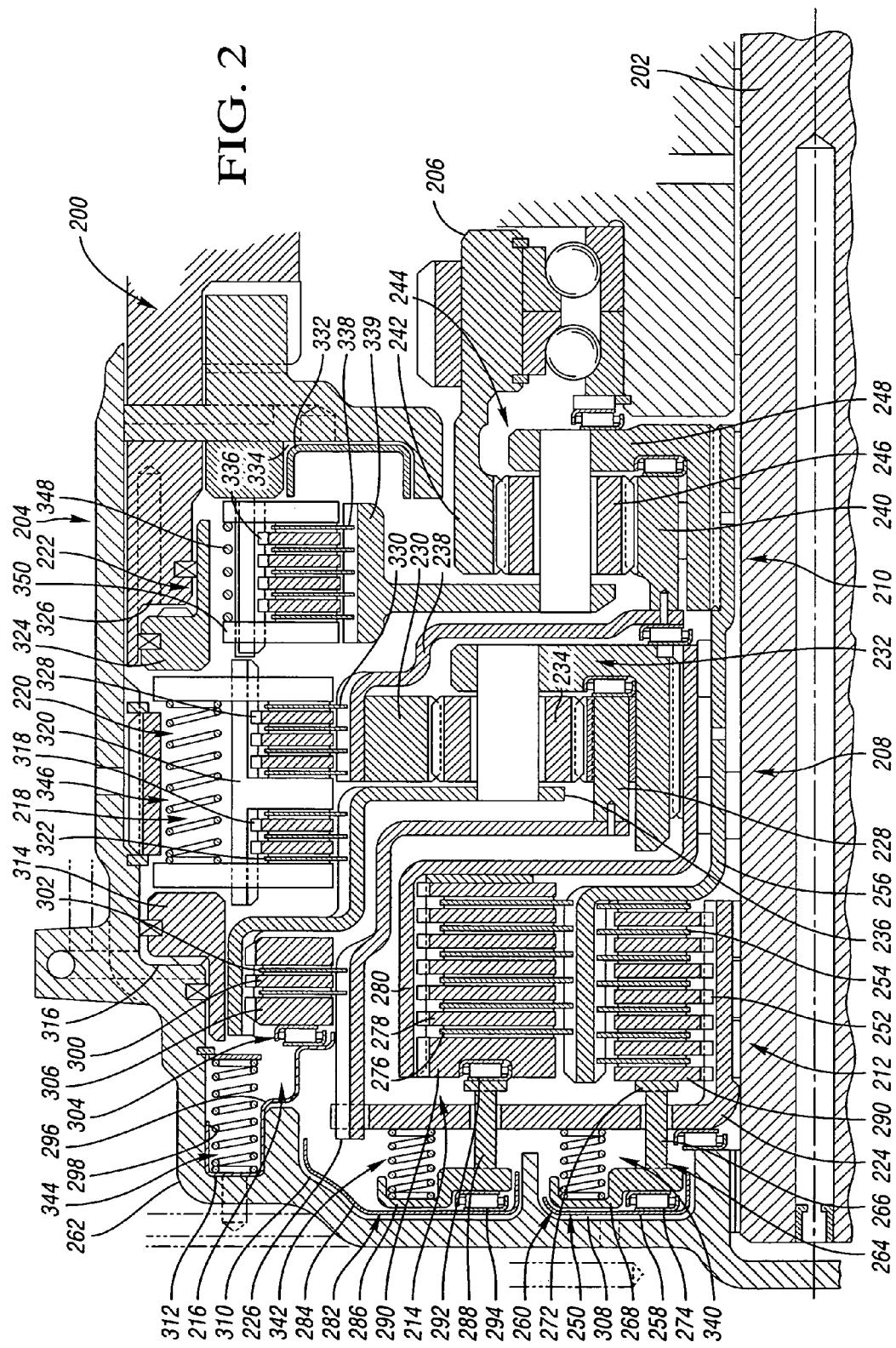
FIG. 2 is a partial cross-sectional view of a power transmission incorporating another embodiment of the present invention.

A planetary transmission 200 shown in FIG. 2 includes an input shaft 202, a planetary gear arrangement 204, and a final drive transfer gear 206. The planetary gear arrangement 204 includes two planetary gear sets 208 and 210, three rotating-type torque-transmitting mechanisms or clutches 212, 214, and 216, and three stationary torque-transmitting mechanisms or brakes 218, 220, and 222. A hub or wall member 224 is splined or otherwise drivingly connected with the input shaft 202. The wall 224 has splined thereto or drivingly connected therewith a housing or shell 226. The shell 226 is drivingly connected with a sun gear member 228, which is a member of the planetary gear set 208. The planetary gear set 208 also includes a ring gear member 230 and a planet carrier assembly member 232. The planet carrier assembly member 232 includes a plurality of pinion gears 234 that are rotatably mounted in a planet carrier 236. The ring gear member 230 is formed integrally with or drivingly connected to a hub 238 that is secured to a sun gear member 240 of the planetary gear set 210. The planetary gear set 210 also includes a ring gear member 242 and a planet carrier assembly member 244. The planet carrier assembly member 244 includes a plurality of pinion gears 246 that are rotatably mounted on a planet carrier 248. The ring gear member 242 is formed integrally with or otherwise secured to the transfer gear 206.

The rotating-type torque-transmitting mechanism or clutch 212 includes a fluid-operated piston 250, a plurality of clutch plates 252, which are splined to the wall 224, and a plurality of friction plates 254 that are splined to a hub 256, which is drivingly connected with the planet carrier 248 of the planet carrier assembly member 244. The piston 250 includes a nonrotating member 258, which is slidably disposed in a cavity 260 formed in a transmission housing 262. The piston 250 also includes a rotating member 264, which includes a plurality of pegs 266 that extend from a plate portion 268 through an opening in the wall 224 and engage with a pressure plate 270 through a bearing member 272. A thrust roller bearing member 274 is disposed between the nonrotating piston member 258 and the rotating member 264. Thus, the piston member 258 is stationary and the member 264 rotates in unison with the wall 224.

The rotating torque-transmitting mechanism or clutch 214 includes a plurality of friction plates 276 that are splined with the hub 256, a plurality of clutch plates 278 that are splined with a hub 280, which is drivingly connected with the planet carrier 236 of the planet carrier assembly member 232. The rotating torque-transmitting mechanism 214 also includes a fluid-operated piston 282, which has a stationary piston portion 284 and a rotating portion 286. The rotating portion 286 includes a plurality of posts 288 which extend through openings in the wall 224 and engage a pressure plate 290 through a bearing 292. A thrust bearing 294 is disposed between the stationary piston 284 and the rotating portion 286 to accommodate relative rotation between these members. The rotating portion 286 rotates in unison with the wall 224.

The rotating-type torque-transmitting mechanism 216 includes a stationary piston 296 that is slidably disposed in a cavity 298 formed in the transmission housing 262. The rotating-type torque-transmitting mechanism 216 also includes a plurality of clutch plates 300 that are splined and/or drivingly connected with the planet carrier 236 of the planet carrier assembly member 232, and a plurality of friction plates 302 that are splined with or otherwise drivingly connected with the shell 226. Therefore, the friction plates 302 rotate in unison with the wall 224 and input shaft 202. The torque-transmitting mechanism 216 has a roller thrust bearing 304 disposed between the stationary piston 296 and a pressure plate 306. The roller thrust bearing 304 will accommodate relative rotation between the pressure plate 306 and the stationary piston 296, hence the pressure plate 306 will rotate in unison with the planet carrier 236 whether the torque-transmitting mechanism 216 is engaged or not.

The rotating-type torque-transmitting mechanism 212 has an apply chamber 308 formed between the piston 250 and the transmission housing 262. The rotating-type torque-transmitting mechanism 214 has an apply chamber 310 formed between the stationary piston 284 and the housing 262. The rotating-type torque-transmitting mechanism 216 has an apply chamber 312 formed between the piston 296 and the transmission housing 262.

When the torque-transmitting mechanism 212 is engaged, the planet carrier 248 and ring gear member 230 will rotate in unison with the input shaft 202. When the torque-transmitting mechanism 214 is engaged, due to pressurization of the chamber 310, the planet carriers 236 and 248 will rotate in unison. These members can rotate relative to the input shaft due to the presence of the bearing 292. When the torque-transmitting mechanism 216 is engaged, the planet carrier 236 will rotate in unison with the input shaft 202.

The stationary type torque-transmitting mechanism 218 includes an apply piston 314, which is slidably disposed in the transmission housing 262 and cooperates therewith to form an apply chamber 316. The torque-transmitting mechanism 218 further includes a plurality of brake plates 318 that are splined to a stationary hub 320, and a plurality of friction plates 322 that are splined to the planet carrier 236. When the torque-transmitting mechanism 218 is engaged, the planet carrier 236 will be held stationary.

The stationary type torque-transmitting mechanism 220 includes a piston 324 that is slidably engaged in the transmission housing 262 and cooperates therewith to form an apply chamber 326. The torque-transmitting mechanism 220 also includes a plurality of brake plates 328 that are splined with or otherwise drivingly connected to the hub 320, and a plurality of friction plates 330 that are splined with or otherwise drivingly connected with the hub 238, which interconnects the ring gear member 230 with the sun gear member 240. When the torque-transmitting mechanism 220 is engaged, the ring gear member 230 and sun gear member 240 will be held stationary.

The stationary-type torque-transmitting mechanism 222 includes a piston 332 that is slidably disposed in the housing 226 and cooperates therewith to form an apply chamber 334. The torque-transmitting mechanism 222 also includes a plurality of brake plates 336 that are splined with or otherwise connected to the housing 226, and a plurality of friction plates 338 which are splined to a hub 339 formed on the planet carrier 248. Thus, when the torque-transmitting mechanism 222 is engaged, the planet carrier 248 will be held stationary.

The torque-transmitting mechanisms 212, 214, and 216 have respective return spring assemblies or spring packs 340, 342, and 344, which are effective to disengage the respective torque-transmitting mechanisms whenever the respective apply chambers 308, 310, and 312 are not pressurized. The torque-transmitting mechanisms 218 and 220 employ a common return spring assembly or spring pack 346 which will ensure that these torque-transmitting mechanisms are disengaged when their respective pistons 314 and 324 are not supplied with fluid pressure in their respective apply chambers. The torque-transmitting mechanism 222 has a single large spring 348 when encircles a hub 350 which is secured or drivingly connected with the transmission housing 262.

As is evident from the above description and reviewing the drawings, the torque-transmitting mechanisms 212, 214, and 216 are rotating-type torque-transmitting mechanisms each having a stationary apply piston. The use of the stationary apply pistons permits the simple distribution of fluid pressure to the respective apply chambers 308, 310, and 312 without the need for rotating-type seal assemblies. Also, these stationary pistons permit radial stacking of the three torque-transmitting mechanisms, thereby saving considerable axial space within the transmission assembly.

The planetary gear arrangement 204 supplies essentially the same five forward speeds and one reverse speed as are available with the transmission described in FIGS. 1a and 1b. For the reverse speed ratio, the torque-transmitting mechanism 216 and the torque-transmitting mechanism 222 are selectively engaged. During the first and lowest forward speed ratio, the torque-transmitting mechanism 214 and the torque-transmitting mechanism 222 are engaged. During the second forward speed ratio, the torque-transmitting mechanism 214 and the torque-transmitting mechanism 220 are engaged. During the third forward speed ratio, the torque-transmitting mechanism 214 and the torque-transmitting mechanism 212 are engaged. During the fourth forward speed ratio, the torque-transmitting mechanism 212 and the torque-transmitting mechanism 220 are engaged. To establish the fifth forward speed ratio, the torque-transmitting mechanisms 212 and 218 are engaged.

Figure 3B:
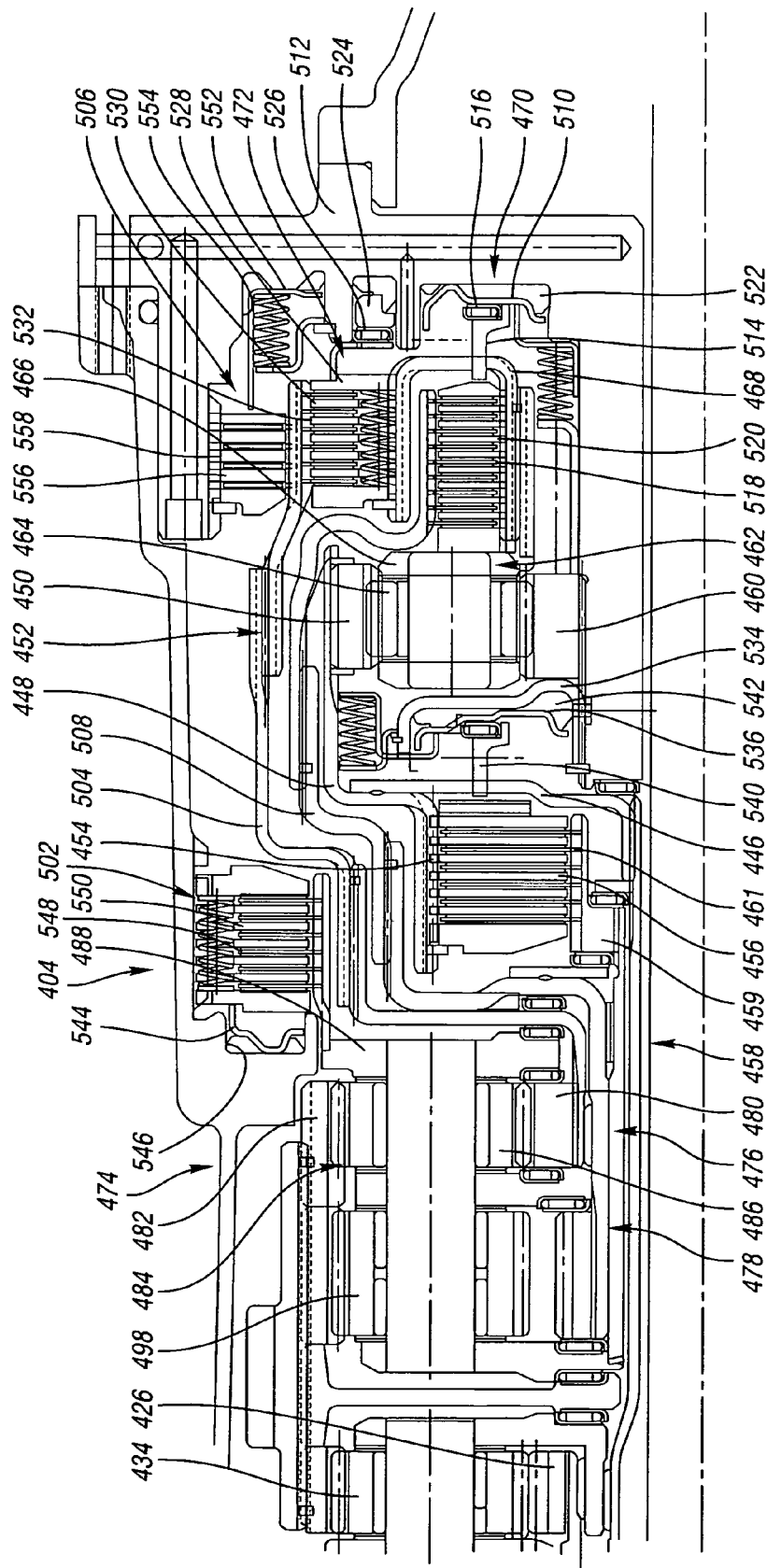

A planetary transmission 400 is shown in FIGS. 3a and 3b. The transmission 400 includes a conventional torque converter and torque converter clutch assembly 402, a planetary gear arrangement 404, and a final drive mechanism 406. The torque converter and clutch assembly 402 is drivingly connected with an engine crankshaft 408, which delivers power to the torque converter 402.

The torque converter 402 is drivingly connected with a transmission input shaft 410 which in turn is drivingly connected with a sun gear member 412 disposed in meshing relationship with a plurality of pinion gears 414 which also mesh with a sun gear member 416. The sun gear member 416 is drivingly connected with an input sleeve shaft 418. The pinion gears 414 are rotatably mounted on a planet carrier assembly member 420, which has a planet carrier 422 drivingly connected with a transmission output shaft 424, and with a sun gear member 426 of a differential planetary gear set 428. The differential planetary gear set 428 also includes a ring gear member 430, a plurality of pinion gears 432 disposed in meshing relationship with the sun gear member 426, and a plurality of pinion gears 434 disposed in meshing relationship with both the pinion gears 432 and the ring gear member 430.

The pinion gears 432 and 434 are rotatably mounted in a planet carrier 436, which is drivingly connected with a sprocket or gear 438, which is a component of the final drive mechanism 406. The final drive mechanism 406 also includes a second sprocket or gear 440, which is drivingly connected with the sprocket or gear 438 through a conventional chain 442. The sprocket 440 drives a shaft 444, which is operatively or drivingly connected with a drive mechanism for at least one pair of driving wheels for a passenger vehicle. The output shaft 424 is also drivingly connected with a final drive mechanism, not shown, for another pair of the driving wheels for a passenger vehicle.

The input sleeve shaft 418 is secured to or drivingly connected with a hub 446, which is secured to a hub 448 that is drivingly connected to a ring gear member 450, which is a component of an input planetary gear set 452. The hub 448 also has a spline portion 454, which is drivingly connected with a plurality of clutch plates 456 which are components of a rotating torque-transmitting mechanism or clutch 458. The torque-transmitting mechanism 458 also includes an inner hub 459 and plurality of friction plates 461.

The planetary gear set 452 also includes a sun gear member 460 and a planet carrier assembly member 462. The planet carrier assembly member 462 includes a plurality of pinion gears 464 that are rotatably mounted on planet carrier 466 and disposed in meshing relationship with both the sun gear member 460 and the ring gear member 450. The planet carrier 466 is drivingly connected with a hub 468 that is a component of a rotating-type torque-transmitting mechanism 470. The hub 468 is also connected through a portion of a rotating-type torque-transmitting mechanism 472. Thus, the planet carrier 466 is drivingly connected with two rotating-type torque-transmitting mechanisms 470 and 472.

The transmission 404 includes a ratio planetary arrangement 474, which is comprised of two planetary gear sets 476 and 478. The planetary gear set 476 includes a sun gear member 480, a ring gear member 482, and a planet carrier assembly member 484. The planet carrier assembly member 484 includes a plurality of pinion gears 486 that are rotatably supported on a planet carrier 488 and disposed in meshing relationship with both the sun gear member 480 and the ring gear member 482. The planet carrier 488 is drivingly connected with the hub 459.

The planetary gear set 478 includes a sun gear member 490, a ring gear member 492, and a planet carrier assembly member 494. The planet carrier assembly member 494 includes intermeshing pinion gears 496 and 498 that are rotatably mounted on a planet carrier 500. The pinion gears 496 mesh with the sun gear member 490 and the pinion gears 498 mesh with the ring gear member 492. The ring gear member 492 is continuously connected with the ring gear member 482, both of which are continuously connected with the ring gear member 430.

The planet carrier 488 is operatively connected with a stationary-type torque-transmitting mechanism 502. The sun gear member 480 is drivingly connected with a hub 504, which is drivingly connected with both the torque-transmitting mechanism 472 and a torque-transmitting mechanism 506. The sun gear member 490 is drivingly connected with a hub 508, which is also drivingly connected with the torque-transmitting mechanism 470.

The torque-transmitting mechanism 470, as previously mentioned, is a rotating-type torque-transmitting mechanism or clutch. The torque-transmitting mechanism 470 includes a piston 510, which is slidably disposed in a housing 512 of the planetary transmission 400. The piston 510 is therefore stationary. The torque-transmitting mechanism 470 has a rotating member 514 that is operated by the piston 510 through a conventional roller thrust bearing 516. The torque-transmitting mechanism 470 includes a plurality of interdigitated friction plates 518 and clutch plates 520. The friction plates 518 are splined to the hub 468 and the clutch plates 520 are splined to the hub 508. The piston 510 cooperates with the housing 512 to form an apply chamber 522 which when pressurized will cause the friction plates 518 and clutch plates 520 to frictionally engage, thereby transmitting rotating power between the planet carrier 466 and the sun gear member 480.

The torque-transmitting mechanism 472 includes a piston 524, which is slidably disposed in the housing 512 and therefore remains nonrotating during operation. The torque-transmitting mechanism 472 includes a conventional thrust roller or needle bearing 526 which is disposed between the piston 524 and an apply plate 528. The torque-transmitting mechanism 472 also includes a plurality of friction plates 530 interdigitated with a plurality of clutch plates 532, which are drivingly connected with the planet carrier 466 and the hub 504, respectively.

The torque-transmitting mechanism 458 includes a piston 534, which is disposed in a stationary housing 536 that is splined to an extension 538 of the transmission housing 512. This same extension also secures the sun gear member 460 from rotation. The torque-transmitting mechanism 458 also includes a rotating apply member 540 that is operable to cause engagement of the plates 456 and 461 whenever an apply chamber 542 formed between the housing 536 and the piston 534 is pressurized.

The torque-transmitting mechanism 502 is a stationary-type torque-transmitting mechanism and includes an apply piston 544 that is slidably disposed in a cavity 546 formed in the housing 512. The torque-transmitting mechanism 502 also includes a plurality of brake plates 548 and friction plates 550 that are splined with the housing 512 and the planet carrier 488, respectively. Whenever the torque-transmitting mechanism 502 is engaged, the planet carrier 488 will be held stationary.

The torque-transmitting mechanism 506 includes an apply piston 552, which is slidably disposed in a cavity 554 formed in the housing 512, a plurality of brake plates 556, and a plurality of friction plates 558, which are drivingly connected with the housing 512 and the hub 504, respectively. Whenever the torque-transmitting mechanism 506 is engaged, the sun gear member 480 will be held stationary.

The torque-transmitting mechanisms 470, 472, and 458 are rotating-type torque-transmitting mechanisms each having a nonrotating piston. The torque-transmitting mechanisms 470, 472, and 506 are radially stacked on one side of the input planetary gear set 452, and the torque-transmitting mechanisms 458 and 502 are substantially relatively radially disposed on the opposite side of the input planetary gear set 452. The use of nonrotating pistons permits the easy supply of fluid pressure from a conventional control system, not shown, to each of the apply chambers for the torque-transmitting mechanisms. The apply pressures for the torque-transmitting mechanisms 458, 470, 472, and 506 are supplied through the end surface of the left end of the transmission housing 512 and through the extension 538. Thus, the passages are easily installed with cross-drilled passages in the housing and extension. The torque-transmitting mechanism 502 is supplied with fluid pressure through a passage formed in the housing 512 and communicated with the control assembly, not shown.

The use of these stationary or nonrotating piston-type torque-transmitting mechanisms requires less axial space than rotating-type torque-transmitting mechanisms with rotating pistons, and also eliminates the need for rotating-type seal assemblies which are known to impose drag losses on a planetary transmission.

The planetary transmission 400 provides six forward speed ratios and one reverse speed ratio through judicious selection of the torque-transmitting mechanisms 458, 470, 472, 502, and 506 in combinations of two. The reverse speed ratio is established with the engagement of the torque-transmitting mechanisms 472 and 502. The first forward speed ratio is established with the engagement of the torque-transmitting mechanisms 470 and 502. The second forward speed ratio is established with the engagement of the torque-transmitting mechanisms 470 and 506. The third forward speed ratio is established with the engagement of the torque-transmitting mechanisms 470 and 472. The fourth forward speed ratio is established with the engagement of the torque-transmitting mechanisms 470 and 458. The fifth forward speed ratio is established with the engagement of the torque-transmitting mechanisms 458 and 472. The sixth and highest forward speed ratio is established with the engagement of the torque-transmitting mechanisms 458 and 506.

By the nesting of the torque-transmitting mechanisms about the input planetary gear set 452, a considerable amount of axial space is saved in the overall length of the transmission assembly.

Figure 4:
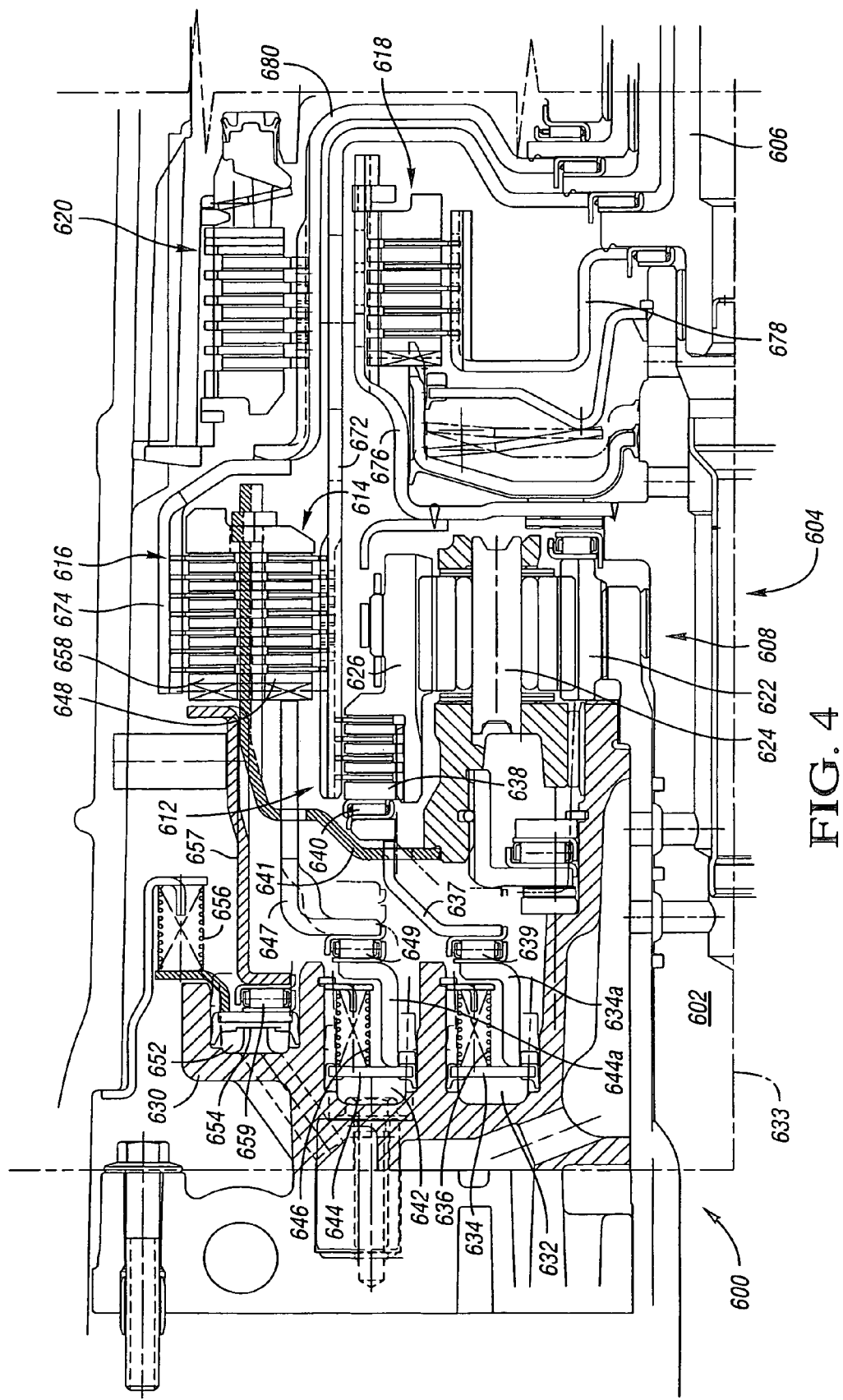
FIG. 4 is a cross-sectional view of a power transmission incorporating yet another embodiment of the present invention.

A planetary transmission 600 shown in FIG. 4 includes an input shaft 602 (a/k/a an input), a planetary gear arrangement 604, and an output shaft 606 (a/k/a an output) supported within a transmission housing 630. The planetary gear arrangement 604 includes a planetary gear set 608, four rotating-type torque-transmitting mechanisms 612, 614, 616, 618, and one stationary-type torque-transmitting mechanism or brake 620.

The planetary gear set 608 includes a stationary sun gear 622, a carrier 624, and a ring gear 626.

The stationary transmission housing 630 forms first, second and third stationary piston chambers 632, 642, 652 which are positioned radially outboard of each other, sequentially. The piston chambers 632 and 642 are positioned axially overlapping each other (i.e., piston chamber 642 substantially circumscribes piston chamber 632), and the piston chamber 652 partially axially overlaps the piston chambers 632, 642 with respect to the transmission axis 633.

Fluid in the piston chamber 632 is operative to actuate movement of the piston 634 to the right as viewed in FIG. 4 against the force of the return spring 636 for moving the apply member 637 toward the apply plate 638 to apply the clutch 612. A bearing 639 is positioned between the piston component 634a and the apply member 637 to accommodate rotation therebetween, and a bearing 640 is positioned between the apply member 637 and the apply plate 638 to accommodate rotation therebetween.

Pressurized fluid in the piston chamber 642 is operative to actuate movement of the piston 644 to the right as viewed in FIG. 4 against the force of the return spring 646 to actuate movement of the apply member 647 to engage the apply plate 648 for applying the clutch 614. A bearing 649 is positioned between the piston component 644a and the apply member 647 to accommodate rotation therebetween. As shown, the apply member 647 is castellated to protrude through the housing member 641.

Pressurized fluid in the piston chamber 652 causes movement of the piston 654 to the right as viewed in FIG. 4 against the force of the return spring 656 to actuate movement of the apply member 657 toward the apply plate 658 for engaging the clutch 616. A bearing 659 is positioned between the piston 654 and the apply member 657 to accommodate rotation therebetween.

Actuation of the clutch 612 operatively connects the ring gear 626 with the output member 672. Actuation of the clutch 614 operatively connects the housing member 641 with the output member 672. Actuation of the clutch 616 operatively connects the housing member 641 with the output member 674. Actuation of the clutch 618 operatively connects the clutch housing 676 with the clutch hub 678. Actuation of the brake 620 connects the output member 680 with the transmission housing 630.

In view of the foregoing disclosure, many modifications and variations are possible in light of this disclosure. It is therefore to be understood that the invention is only to be limited by the scope of the appended claims.

The invention claimed is:

1. A planetary transmission comprising:
   an input;
   an output;
   a stationary transmission housing rotatably supporting said input and said output;
   a first planetary gear mechanism having a first member, a second member, and a third member;
   a second planetary gear mechanism including a plurality of members;
   at least first and second rotating torque transmitting mechanisms selectively connectable between said input and respective members of at least one of said planetary gear mechanisms;
   said first rotating torque transmitting mechanism being positioned radially outboard of and axially overlapped by said second rotating torque transmitting mechanism;
   said first rotating torque transmitting mechanism having an apply piston slidably disposed in said stationary transmission housing, an apply plate rotatable with at least one portion of said first rotating torque transmitting mechanism, and a bearing disposed between said apply piston and said apply plate to accommodate rotation therebetween;
   said second rotating torque transmitting mechanism having a second apply piston slidably disposed in said stationary transmission housing, a second apply plate continuously rotatable with a portion of said second rotating torque transmitting mechanism, and a bearing disposed between said second apply piston and said second apply plate;

a third rotating torque transmitting mechanism positioned axially adjacent one of said planetary gear sets; and said third rotating torque transmitting mechanism having a third apply piston slidably disposed in said stationary transmission housing, a third apply plate rotatable with a rotatable portion of said third rotating torque transmitting mechanism, and a bearing disposed between said third apply piston and said third apply plate to accommodate relative rotation therebetween.

2. A planetary transmission comprising:

an input member;

an output member;

a stationary transmission housing rotatably supporting said input member and said output member;

a planetary gear mechanism positioned within the said transmission housing;

first, second and third rotating torque transmitting mechanisms positioned within the said transmission housing, and having first, second and third apply pistons, respectively;

said transmission housing forming first, second and third stationary piston chambers receiving said first, second and third apply pistons, respectively;

wherein said first, second and third piston chambers are positioned radially outboard of each other, sequentially.

3. The planetary transmission of claim 2, wherein said first, second and third rotating torque transmitting mechanisms further comprise first, second and third apply members, respectively, and a bearing member positioned between each of said pistons and each of said apply members to accommodate rotation therebetween.

4. The planetary transmission of claim 3, further comprising a second bearing member operatively connected between the first apply member and an apply plate of the first torque-transmitting mechanism.

5. The planetary transmission of claim 3, wherein at least two of said first, second and third piston chambers are positioned axially overlapping each other.

6. A planetary transmission comprising:

an input;

an output;

a stationary transmission housing rotatably supporting said input and said output;

a planetary gear mechanism positioned within the transmission housing;

first, second and third rotating torque transmitting mechanisms positioned within the transmission housing, and having first, second and third apply pistons, respectively;

said transmission housing forming first, second and third stationary piston chambers receiving said first, second and third apply pistons, respectively;

wherein said first, second and third piston chambers are positioned radially outboard of each other, sequentially, with at least two of said first, second and third piston chambers axially overlapping each other;

wherein said first, second and third rotating torque transmitting mechanisms further comprise first, second and third apply members, respectively, a first bearing member positioned between one of said pistons and the respective apply member to accommodate rotation therebetween, and a second bearing member operatively connected between said respective apply member and the respective apply plate.

7. A planetary transmission comprising:

an input;

an output;

a stationary transmission housing rotatably supporting said input and said output;

a first planetary gear mechanism having a first member, a second member, and a third member;

a second planetary gear mechanism including a plurality of members;

at least first and second rotating torque transmitting mechanisms selectively connectable between said input and respective members of at least one of said planetary gear mechanisms;

said first rotating torque transmitting mechanism having an apply piston slidably disposed in said stationary transmission housing, an apply plate, an intermediate apply member, a first bearing disposed between said apply piston and said intermediate apply member to accommodate rotation therebetween, and a second bearing disposed between said intermediate apply member and said apply plate to accommodate rotation therebetween.

* * * * *